(12) United States Patent
Ikeda et al.

(10) Patent No.: US 7,077,415 B2
(45) Date of Patent: Jul. 18, 2006

(54) HAND-DRIVEN VEHICLE

(75) Inventors: Shigeru Ikeda, Kunitachi (JP); Shoji Ohshita, Miyoshimachi (JP); Yoshio Sakai, Musashimurayama (JP)

(73) Assignee: France Bed Co., Ltd., Tokyo (JP)

( * ) Notice: Subject to any disclaimer, the term of this patent is extended or adjusted under 35 U.S.C. 154(b) by 0 days.

(21) Appl. No.: 10/942,255

(22) Filed: Sep. 15, 2004

(65) Prior Publication Data

US 2005/0035569 A1    Feb. 17, 2005

Related U.S. Application Data

(63) Continuation of application No. PCT/JP03/11726, filed on Sep. 12, 2003.

(30) Foreign Application Priority Data

| Sep. 18, 2002 | (JP) | ............................. | 2002-271722 |
| Jan. 15, 2003 | (JP) | ............................. | 2003-007121 |
| Jul. 31, 2003 | (JP) | ............................. | 2003-283508 |
| Jul. 31, 2003 | (JP) | ............................. | 2003-283510 |

(51) Int. Cl.
*A63B 21/00* (2006.01)
*B62M 1/14* (2006.01)

(52) U.S. Cl. ...................................... 280/246; 280/282

(58) Field of Classification Search ................ 280/244, 280/245, 246, 247, 248; 297/215.14
See application file for complete search history.

(56) References Cited

U.S. PATENT DOCUMENTS

| 1,503,878 | A |   | 8/1924 | Brady |
| 2,732,221 | A | * | 1/1956 | Welch .......................... 280/246 |
| 4,152,005 | A |   | 5/1979 | Vanore |
| 4,772,069 | A | * | 9/1988 | Szymski .................. 297/215.14 |
| 5,308,097 | A | * | 5/1994 | Bono et al. .................. 280/234 |
| 5,431,614 | A |   | 7/1995 | Jeranson |
| 5,492,349 | A |   | 2/1996 | Ferez |
| 5,997,020 | A | * | 12/1999 | Borg .......................... 280/243 |

FOREIGN PATENT DOCUMENTS

| JP | 48-41845 |   | 6/1973 |
| JP | 52-133635 |   | 11/1977 |
| JP | 54-140334 | A | 10/1979 |
| JP | 56-64889 |   | 5/1981 |
| JP | 3-189286 |   | 8/1991 |
| JP | 4-505143 | A | 9/1992 |
| JP | 3045741 |   | 11/1997 |
| JP | 10-264872 | A | 10/1998 |
| JP | 11-128277 | A | 5/1999 |
| JP | 11-318994 | A | 11/1999 |
| JP | 2001-180564 | A | 7/2001 |
| JP | 2001-224634 | A | 8/2001 |
| JP | 2001-299821 | A | 10/2001 |
| JP | 2002-29484 | A | 1/2002 |
| JP | 2002-65756 | A | 3/2002 |
| JP | 3089727 |   | 8/2002 |

* cited by examiner

*Primary Examiner*—Kevin Hurley
(74) *Attorney, Agent, or Firm*—Frishauf, Holtz, Goodman & Chick, P.C.

(57) ABSTRACT

A vehicle body is provided with a rear wheel at a rear portion, and a front wheel coupled to a handle post. A swing-enabling shaft is rotatably provided on the upper portion of the handle post. A handlebars unit is attached to the swing-enabling shaft such that it can swing forward and backward relative to the vehicle body. When the handlebars unit is swung, a driving mechanism is driven. The driving mechanism rotates the front wheel such that the vehicle body advances, regardless of whether the handlebars unit is swung forward or backward.

10 Claims, 11 Drawing Sheets

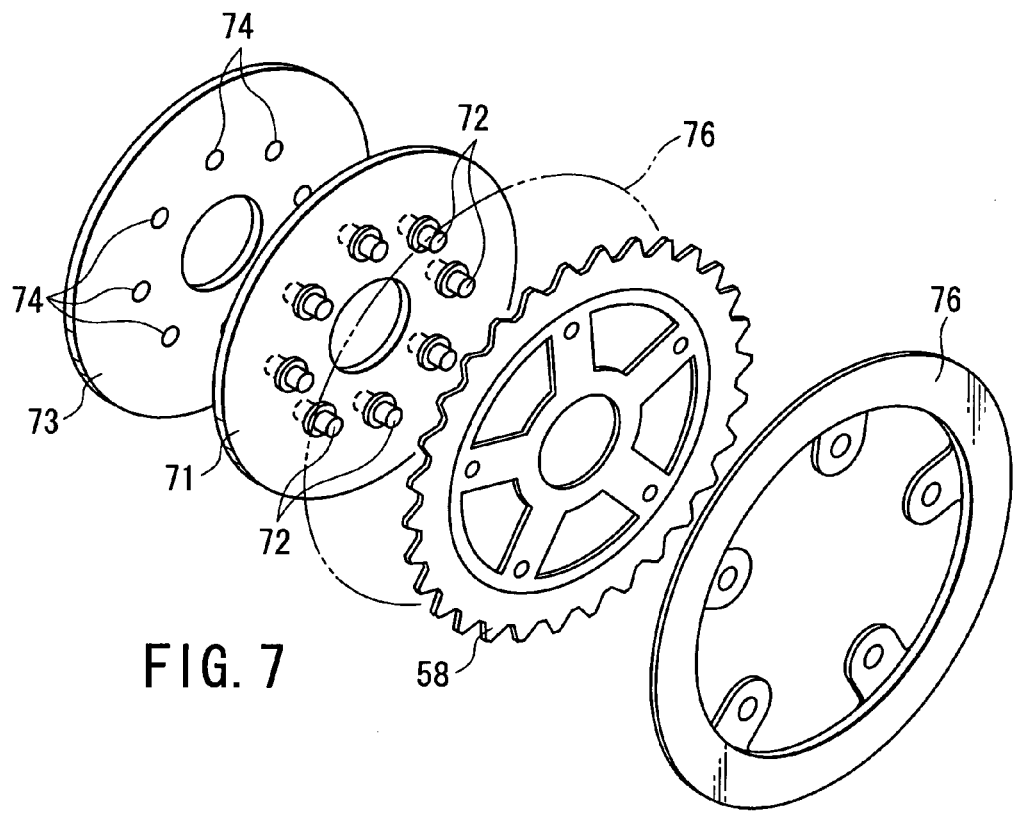
FIG. 7
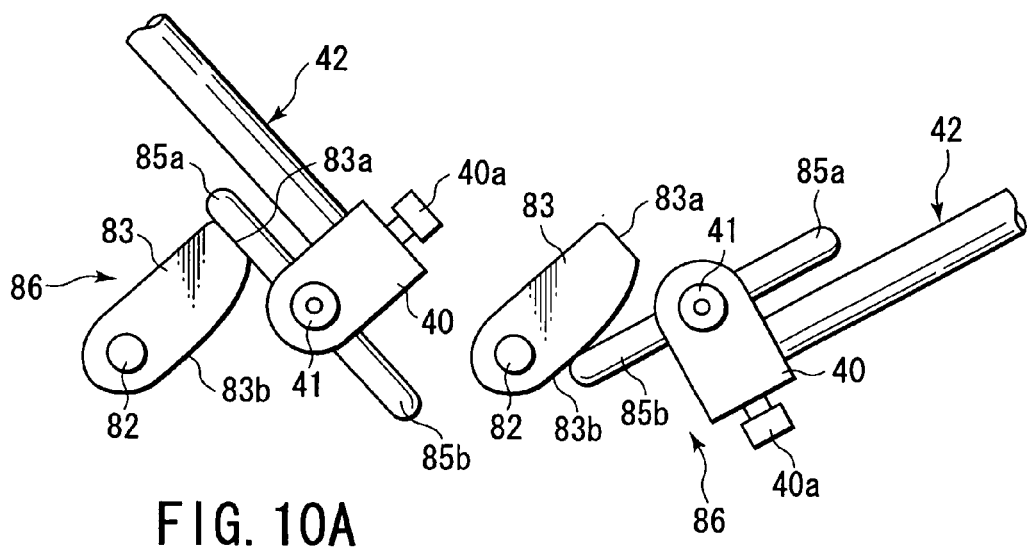
FIG. 10A
FIG. 10B

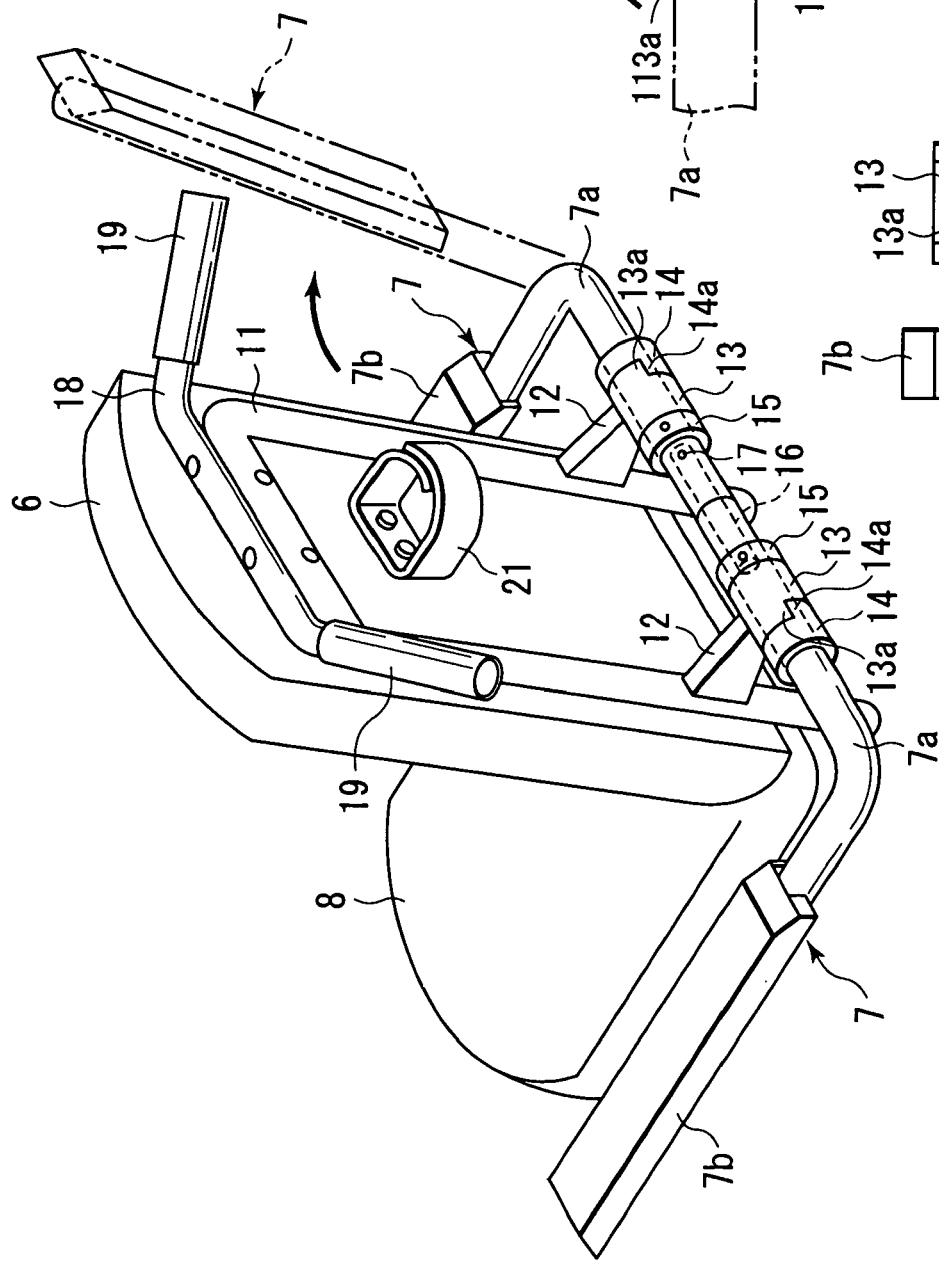
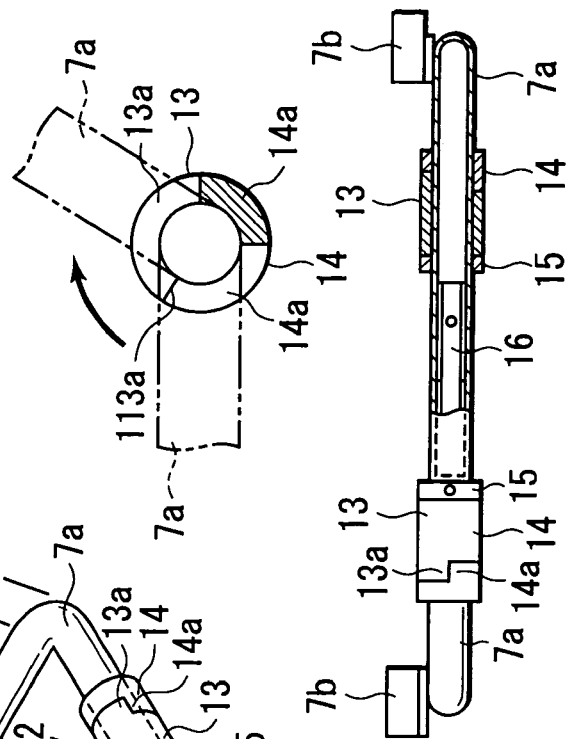
FIG. 8A
FIG. 8B
FIG. 8C

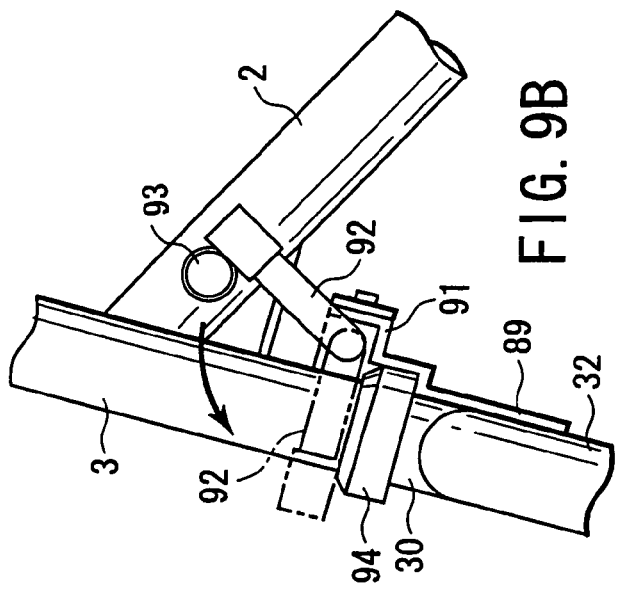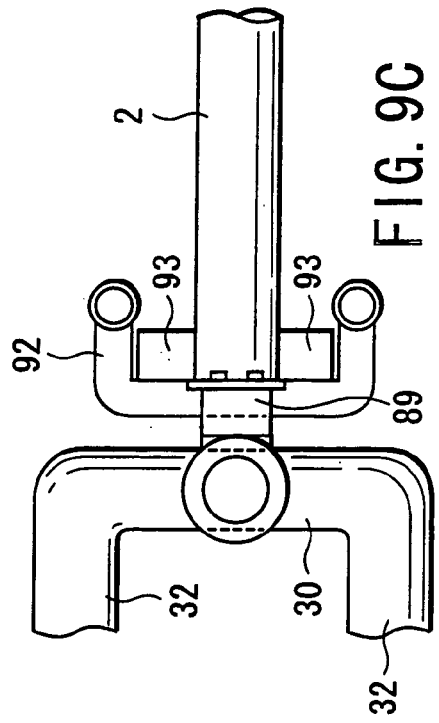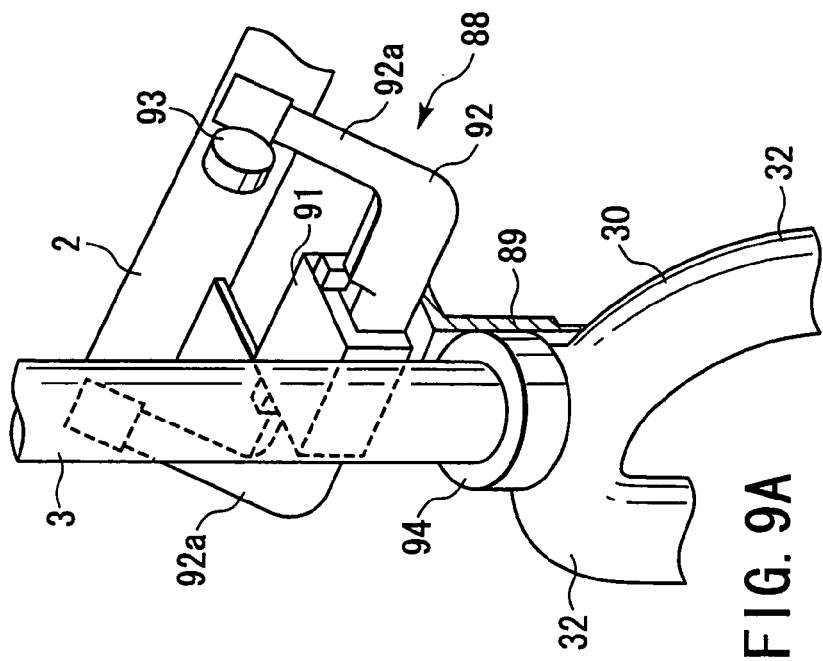

HAND-DRIVEN VEHICLE

CROSS REFERENCE TO RELATED APPLICATIONS

This is a Continuation Application of PCT Application No. PCT/JP03/11726, filed Sep. 12, 2003, which was published under PCT Article 21(2) in Japanese.

This application is based upon and claims the benefit of priority from prior Japanese Patent Applications No. 2002-271722, filed Sep. 18, 2002; and No. 2003-007121, filed Jan. 15, 2003; and No. 2003-283508, filed Jul. 31, 2003; and No. 2003-283510, filed Jul. 31, 2003, the entire contents of all of which are incorporated herein by reference.

BACKGROUND OF THE INVENTION

1. Field of the Invention

The present invention relates to a manpower vehicle that is moved by swinging a handle lever back and forth relative to the vehicle body.

2. Description of the Related Art

A hand-driven tricycle is known which has a front wheel and a pair of rear wheels rotatably attached to the tricycle body. This hand-driven tricycle is arranged such that driving means can forwardly rotate the front wheel or rear wheels. Since hand-driven tricycles are highly stable during traveling, attention is now being paid to them as vehicles for, in particular, people who have disabilities affecting the legs.

A handle lever as a driving mechanism for driving the front wheel or rear wheels is provided on the upper end of the handle post so that it can swing back and forth relative to the tricycle body. When the user swings the handle lever back and forth by the arms, a driving wheel is rotated through a link mechanism that transmits the swing movement to the wheel. A driven wheel is formed integral with the front wheel or rear wheels. The driving and driven wheels are connected by a chain stretched therebetween. As a result, when the handle is swung, the front wheel or rear wheels are rotated via the chain and driven wheel so that the tricycle moves forward.

Conventional hand-driven tricycles employ a link mechanism for converting the swing movement of the handle lever into rotary movement. In the link mechanism, which connects a plurality of link members so that they can rotate, the link members repeatedly pivot, contract and expand, thereby rotating the driving wheel in one direction, i.e., in the direction in which the tricycle body moves forward.

However, when the link members pivotally connected to each other shift from a straightly extended state to an oblique state, they may well be hard to pivot in a predetermined direction, or may be pivoted in the opposite direction.

Accordingly, even though the handle is swung back and forth, the tricycle may not move forward. Further, if the link members are pivoted in the opposite direction, the tricycle may move backward.

The present invention aims to provide a hand-driven tricycle that can be moved forward by swinging the handle lever, without using a link mechanism.

BRIEF SUMMARY OF THE INVENTION

The hand-driven tricycle according to the invention comprises:

a vehicle body;

a rear wheel rotatably provided at a rear portion of the vehicle body;

a rotatable handle post as a front portion of the vehicle body;

a front wheel rotatably provided at a lower portion of the handle post;

a swing-enabling shaft rotatably provided on an upper portion of the handle post;

a handlebars unit attached to the swing-enabling shaft such that the handlebars unit can swing forward and backward relative to the vehicle body with the swing-enabling shaft rotated forward and backward; and a driving mechanism which rotates the front wheel such that the vehicle body advances, when the handlebars unit is swung, the driving mechanism including:

a pair of first power transmission wheels arranged on the swing-enabling shaft via respective one-way clutches such that one of the pair of first power transmission wheels moves in synchrony with a forward rotary movement of the swing-enabling shaft, and the other first power transmission wheel rotates in synchrony with a backward rotary movement of the swing-enabling shaft;

a pair of second power transmission wheels rotatably provided at positions corresponding to the pair of first power transmission wheels;

a pair of first cable members each being stretched between one of the pair of first power transmission wheels and a corresponding one of the pair of second power transmission wheels; and a power transmission mechanism which rotates the front wheel in a direction in which the vehicle body advances, via one of the pair of first power transmission wheels which rotates together with the swing-enabling shaft when the handlebars unit is pushed forward, and also via a corresponding one of the pair of first cable members, the power transmission mechanism rotating the front wheel in the direction in which the vehicle body advances, via the other first power transmission wheel which rotates together with the swing-enabling shaft when the handlebars unit is pulled backward, and also via the other first cable member.

BRIEF DESCRIPTION OF THE SEVERAL VIEWS OF THE DRAWING

FIG. 7 is an exploded perspective view illustrating the essential elements of the clutch mechanism;

FIG. 8A is a perspective view illustrating a seat section; FIG. 8B is a side view partly in section, illustrating a structure in which pivotable armrests are attached to the seat section; FIG. 8C is a view useful in explaining the pivoting of the armrests;

FIG. 9A is a perspective view illustrating a steering angle limiting mechanism; FIG. 9B is a side view of this mechanism; FIG. 9C is a plane view of this mechanism;

FIG. 10A is a view useful in explaining a state in which the angle of forward swing of a handlebars unit is limited; FIG. 10B is a view useful in explaining a state in which the angle of rearward swing is limited;

DETAILED DESCRIPTION OF THE INVENTION

An embodiment of the invention will be described with reference to the accompanying drawings.

Figure 1:
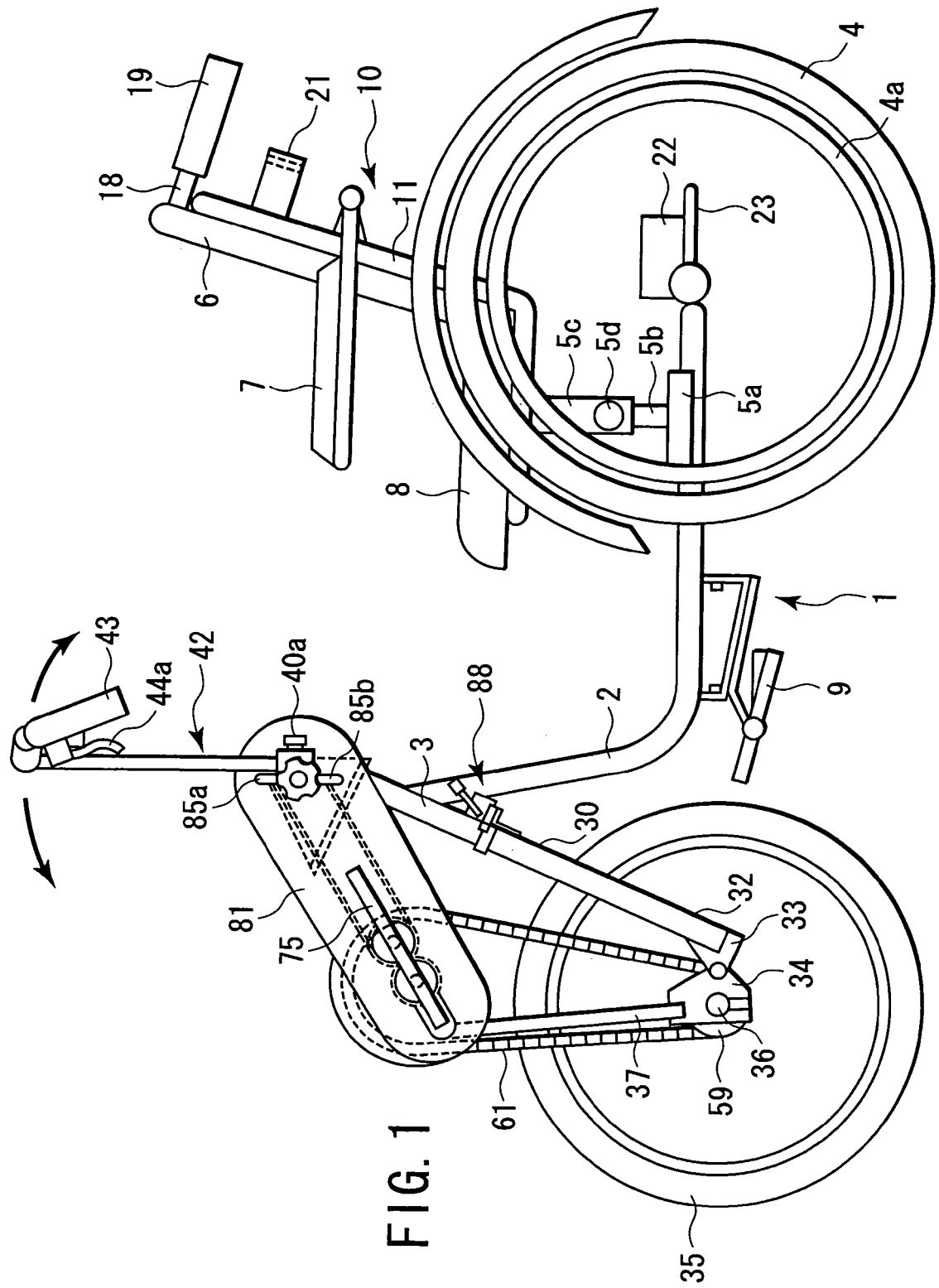
FIG. 1 is a side view illustrating a hand-driven tricycle according to an embodiment of the invention.
Figure 2A:
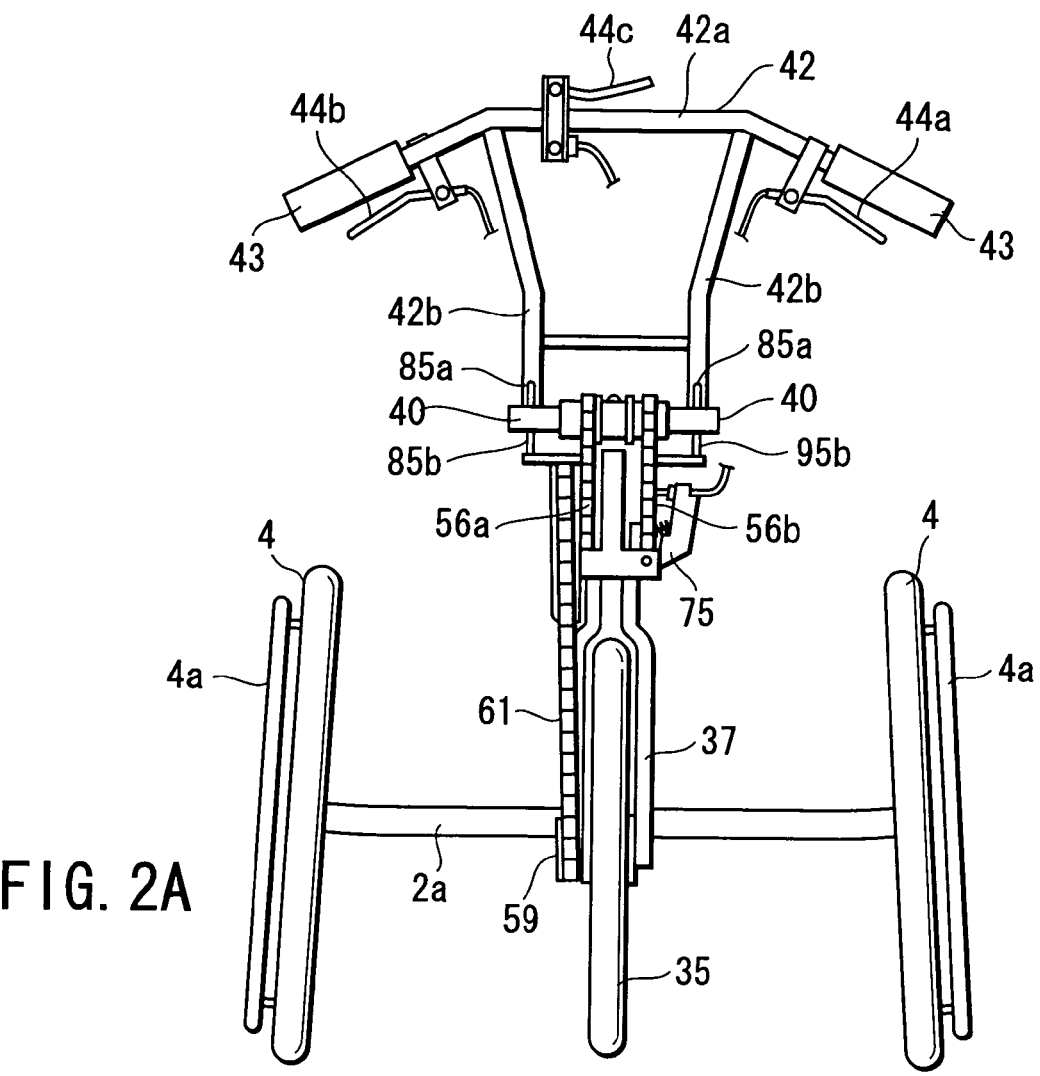
FIG. 2A is a front view illustrating the hand-driven tricycle.

FIG. 1 shows a hand-driven tricycle according to the invention, which has a body 1. The body 1 has a beam 2 that has an upwardly angled front portion, and a slightly inclined cylindrical bearing 3 with its lower end directed forward is attached to the front end of the beam 2. As shown in FIG. 2A, an attachment arm 2a is attached to the rear end of the beam 2. The attachment arm 2a has opposite ends curved slightly upwardly, compared to its middle portion coupled to the beam 2. Respective rear wheels 4 are rotatably attached to the opposite ends of the arm 2a. A handrim 4a having an outer diameter slightly smaller than that of the rear wheels 4 is provided outside each rear wheel 4, formed integral therewith as one body.

Figure 13:
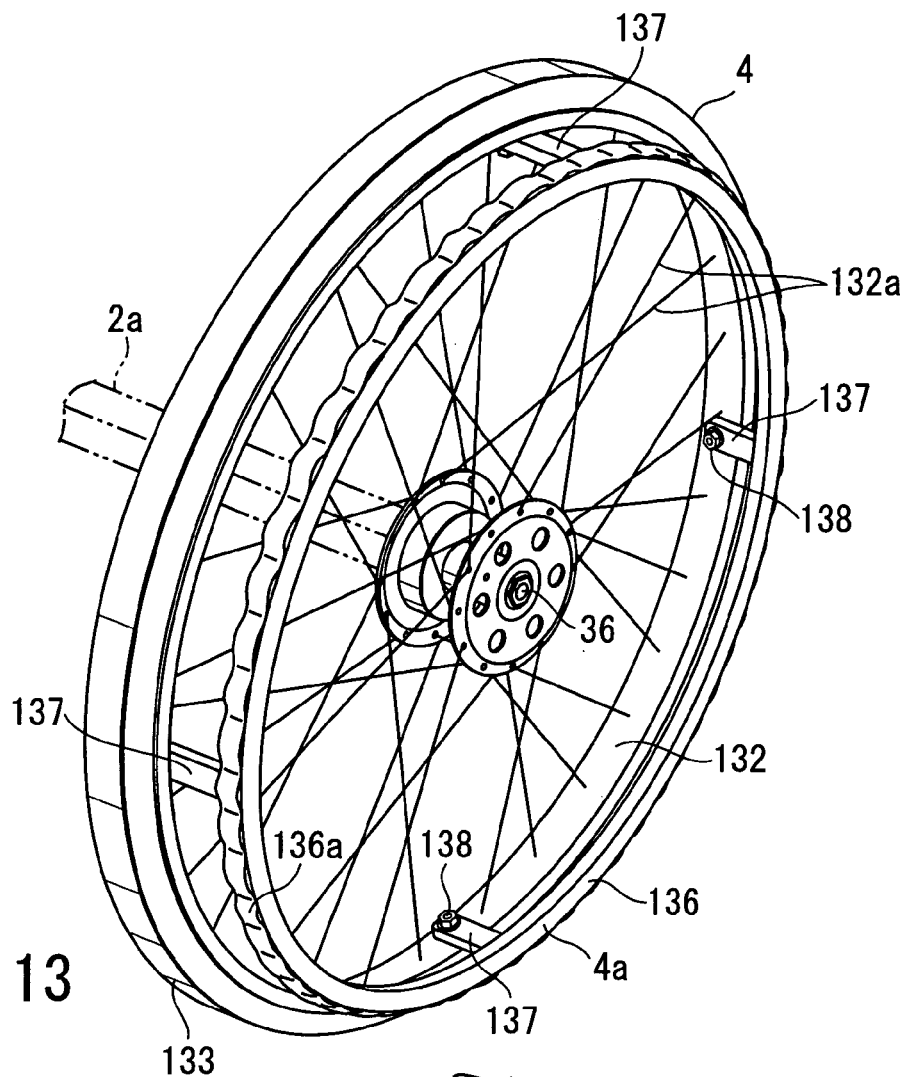
FIG. 13 is a perspective view illustrating a rear wheel provided with a handrim.
Figure 14:
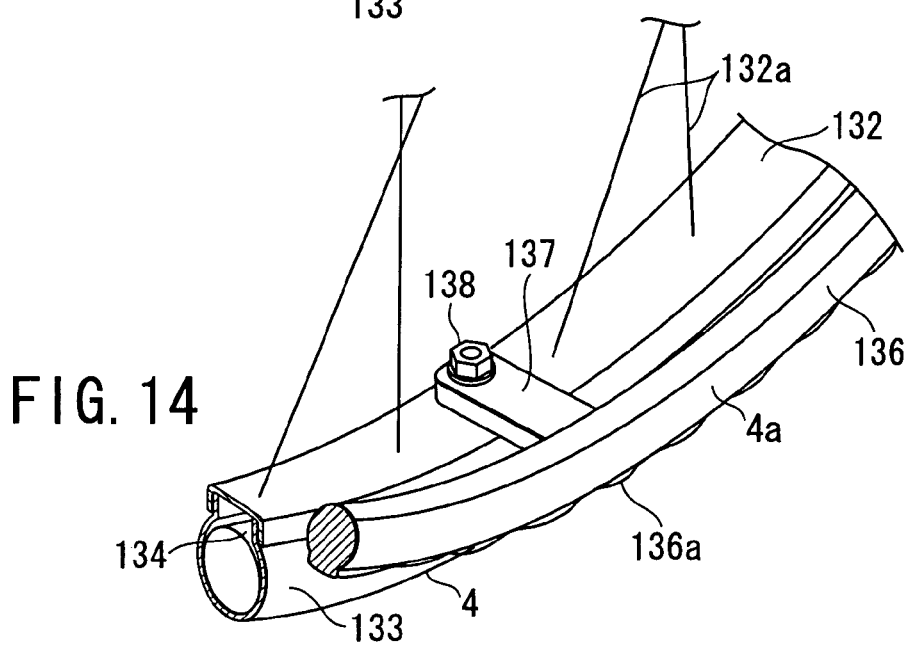
FIG. 14 is a perspective view illustrating part of a handrim attachment structure.

FIG. 13 is a perspective view of each rear wheel 4, while FIG. 14 shows an attachment structure for attaching the handrim 4a. As shown, each rear wheel 4 comprises a wheel 132 reinforced by spokes 132a. A tire 133 is mounted on the outer periphery of the wheel 132. The tire 133 contains a rubber tube 134 into which compressed air is supplied, as shown in FIG. 14.

The aforementioned handrim 4a is provided outside each of the pair of rear wheels 4. The handrim 4a has an outer diameter slightly smaller than the rear wheels 4, and includes an annular portion 136 having an outer peripheral uneven surface 136a, and a plurality of coupling portions 137 projecting from one edge of the annular portion 136, the annular portion and coupling portions being formed as one body of a synthetic resin.

The handrim 4a may be formed of a metal such as steel or aluminum.

Four to eight coupling portions 137 are provided on the annular portion 136 at regular intervals along the circumference. The distal end of each coupling portion 137 is fixed to the inner surface of the wheel 132 by a screw 138. Accordingly, when the user sits on a seat 8, described later, they can grip and rotate the handrims 4a to thereby rotate the rear wheels 41.

As shown in FIG. 1, a base member 5a that can be positioned in the longitudinal direction of the body 1 is provided on the rear end portion of the beam 2. A post 5b stands from the base member 5a. A seat section 10 is provided on the upper end of the post 5b. The seat section 10 includes a frame 11 formed of a pipe member that has an L-shaped side surface. To the frame 11, a back 6, the abovementioned seat 8, and right and left armrests 7 are attached.

A pipe-shaped receiving member 5c projects from the lower end of the seat 8 such that it is slidably mounted around the post. The level of the receiving member 5c can be adjusted relative to the post 5b by a screw 5d. As a result, the vertical and horizontal positions of the seat section 10 relative to the body 1 can be adjusted as indicated by the solid line and chain line in FIG. 11B.

Footboards 9 for permitting the user sitting on the seat section 10 to place their legs thereon are provided near the middle portion of the beam 2. Each footboard 9 is in the shape of a box that has a peripheral wall for preventing a corresponding leg from slipping off, and a band (not shown) for holding the leg.

As shown in FIG. 8A, respective brackets 12 are fixed to the opposite lower ends of the rear surface of the back 6 of the frame 11. Respective short support tubes 13 arranged coaxial are secured to the brackets 12. Each armrest 7 has an arm 7a formed of an L-shaped pipe. One end of each arm 7a is rotatably inserted in the corresponding short support tube 13, while the other end is provided with an armrest member 7b.

As seen from FIGS. 8A to 8C, an engagement member 14 having a stepped portion 14a is secured to the abovementioned one end of each arm 7a. When each armrest 7 is positioned substantially horizontal, the end of each engagement member 14 provided with the stepped portion 14a is engaged with an end of a stepped portion 13a provided on an end surface of the corresponding short support tube 13. In this state, the armrest is prevented from rotating downwardly.

The end of each arm 7a projects to the other end of the short support tube 13, and a stopper ring 15 is fitted on the projecting end. Further, a support shaft 16 is inserted in the opposite ends of the pair of arms 7a such that it can rotate relative to the ends of the pipe members 7a. The support shaft 16 is fixed to one of the arms 7a by a stopper pin 17. As a result, the armrests 7 can pivot from the horizontal position indicated by the solid line in FIG. 8A to the standing position indicated by the chain line. The angle in the standing position is limited since the stepped portion 14a of each engagement member 14 is brought into contact with the other surface 113a of the stepped portion 13a of the corresponding short support tube 13 as shown in FIG. 8C. The angle of pivoting of the armrests 7 from the horizontal position to the standing position is set to about 100 degrees.

Since thus, the armrests 7 provided at the opposite ends of the seat 8 can be rotated individually, the user can take and leave the seat section 10 from both sides of the body 1, and further, the user is protected by the right and left armrests 7 from falling down.

The user sitting on the seat section 10 can hold their bodies thereon with a seatbelt (not shown).

A handle member 18 formed of a pipe member is provided, with its longitudinally middle portion fixed, along the upper side of the attachment member 11 that is provided on the rear surface of the back 6. The opposite ends of the handle member 18 are angled at 45 degrees relative to the rear surface of the back 6. Cylindrical grip portions 19 formed of, for example, rubber are provided on the angled portions for permitting a care assistant to grip them.

Figure 11A:
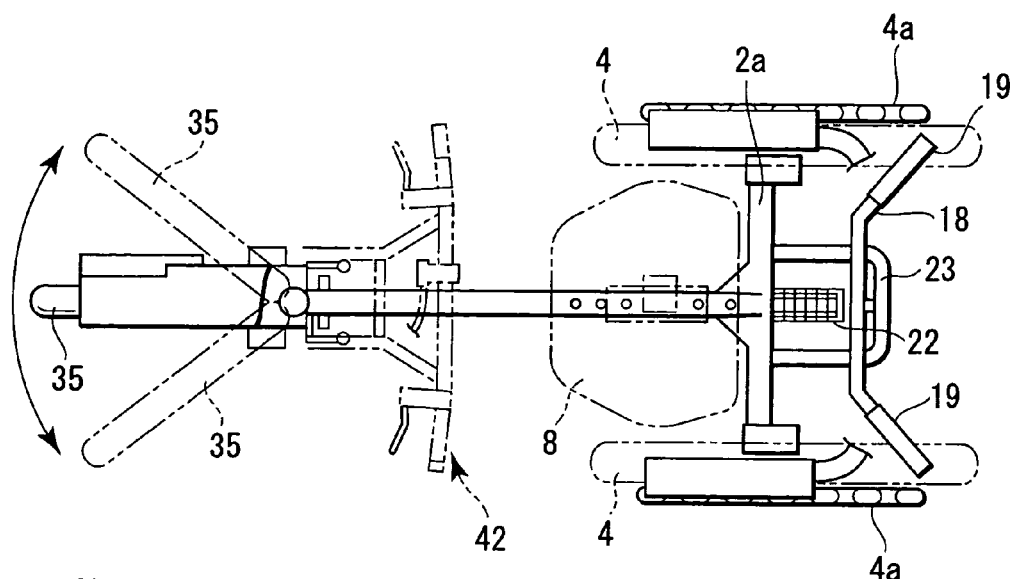
FIG. 11A is a plan view illustrating the steering range of the front wheel of a hand-driven tricycle.
Figure 11B:
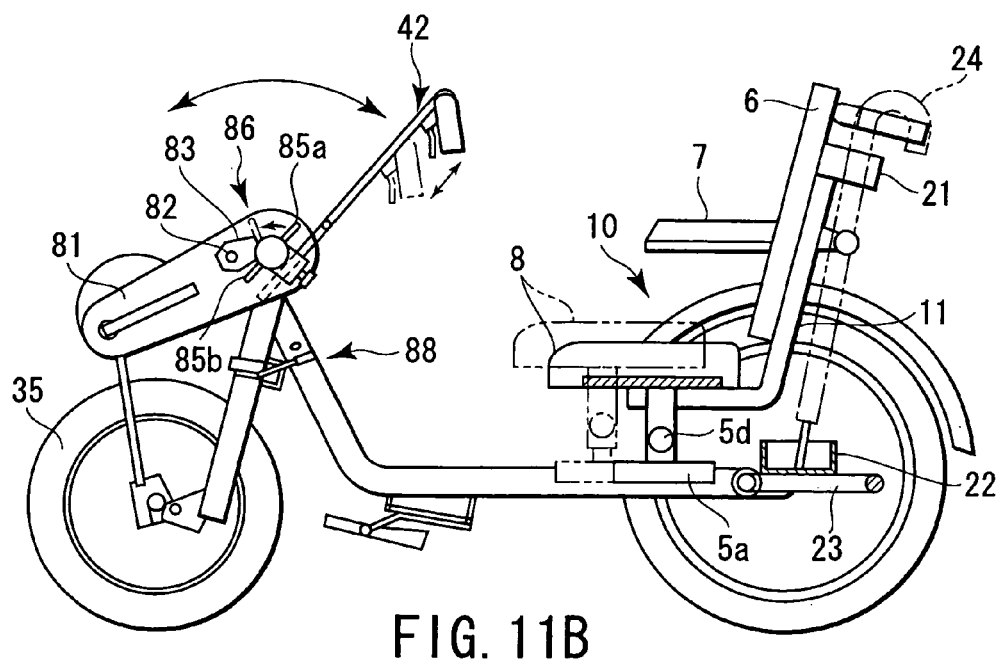
FIG. 11B is a side view illustrating the swing range of the handlebars unit of the hand-driven tricycle.

A holding member 21 obtained by looping an elastic strip member formed of, for example, a synthetic resin and having a predetermined length is provided below the handle member 18, with its middle portion fixed to the rear surface of the back 6. An upper-opening receiving member 22 is provided below the holding member 21 as shown in FIGS. 1, 11A and 11B. The receiving member 22 is provided on a receiving frame 23 attached as a receiving portion to the attachment arm 2a to which the rear wheels 4 are attached.

The holding member 21 elastically holds a to-be-held object such as an umbrella or cane. In this embodiment, the upper portion of an umbrella 24 is held as indicated by the chain line in FIG. 11B. The lower end of the umbrella 24 is received by the receiving member 22. Thus, the user or the care assistant can make a long to-be-held object, such as the umbrella 24, be held.

Figure 3:
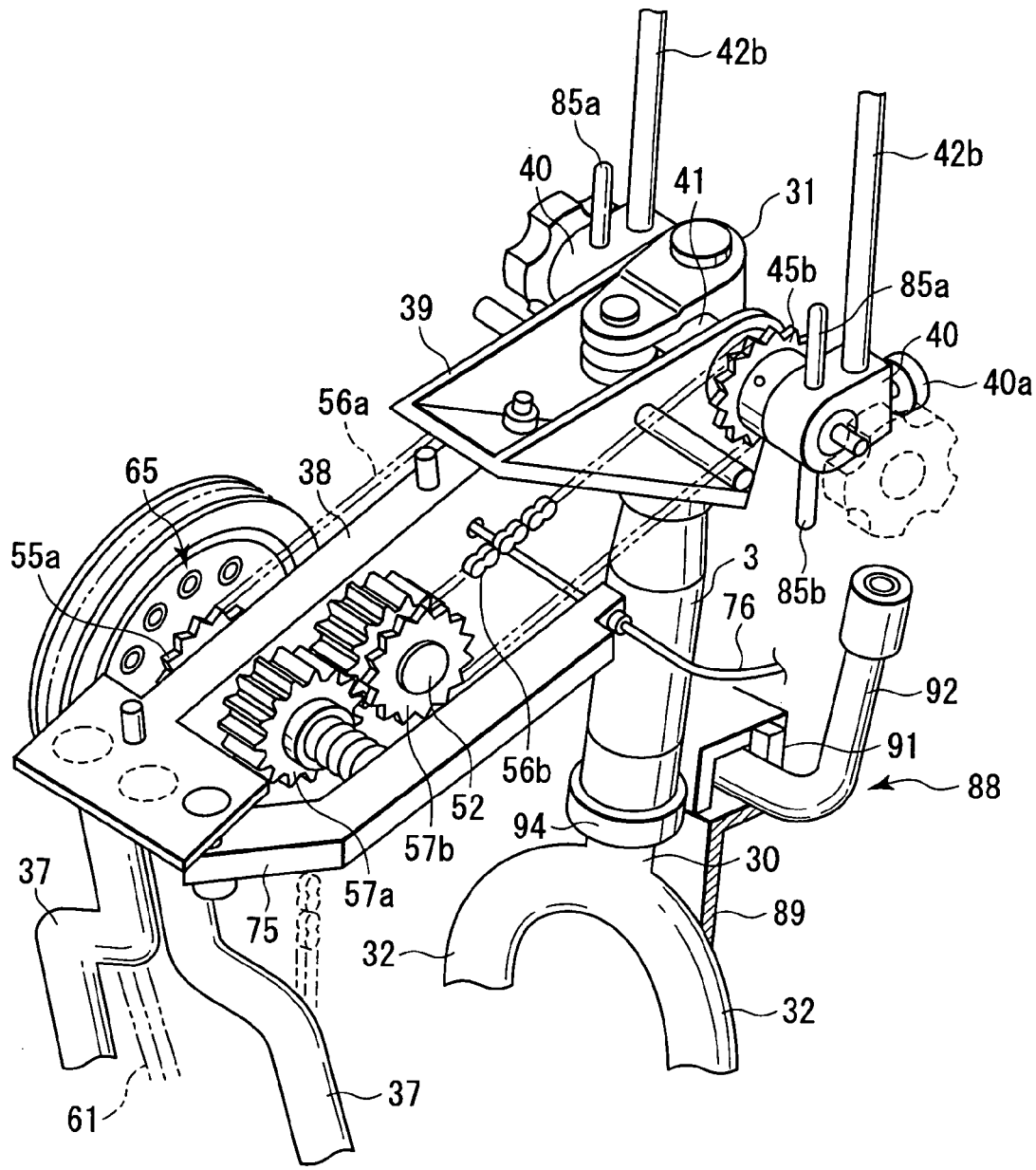
FIG. 3 is a perspective view illustrating, without a cover, a driving mechanism provided on a handle post.
Figure 5:
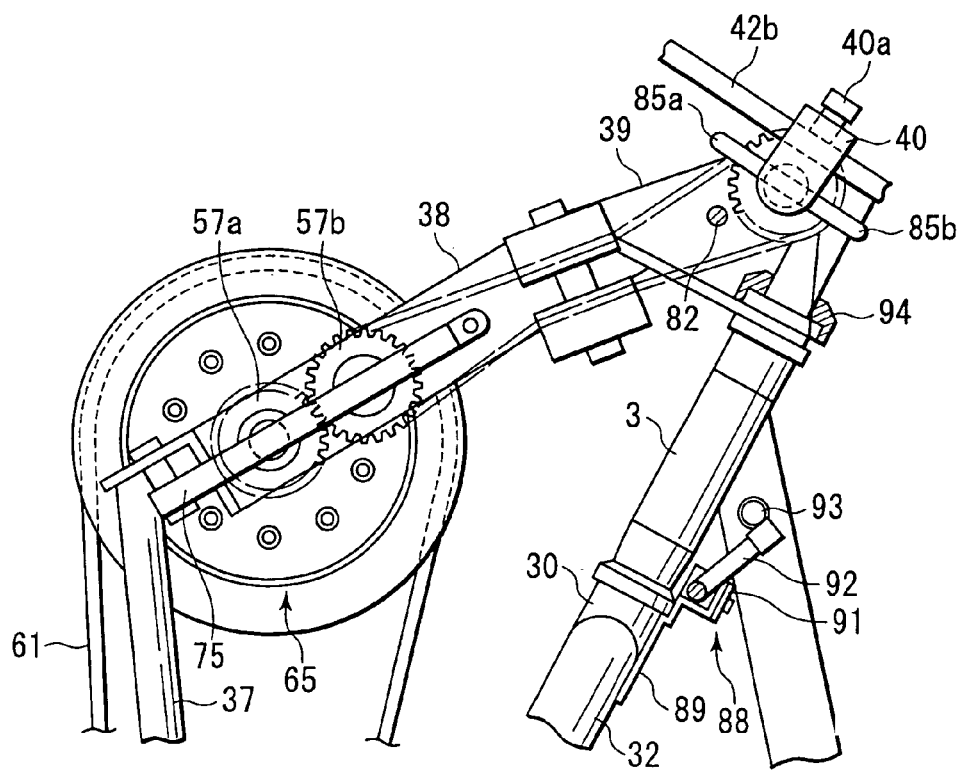
FIG. 5 is a side view of the driving mechanism shown in FIG. 3.
Figure 12A:
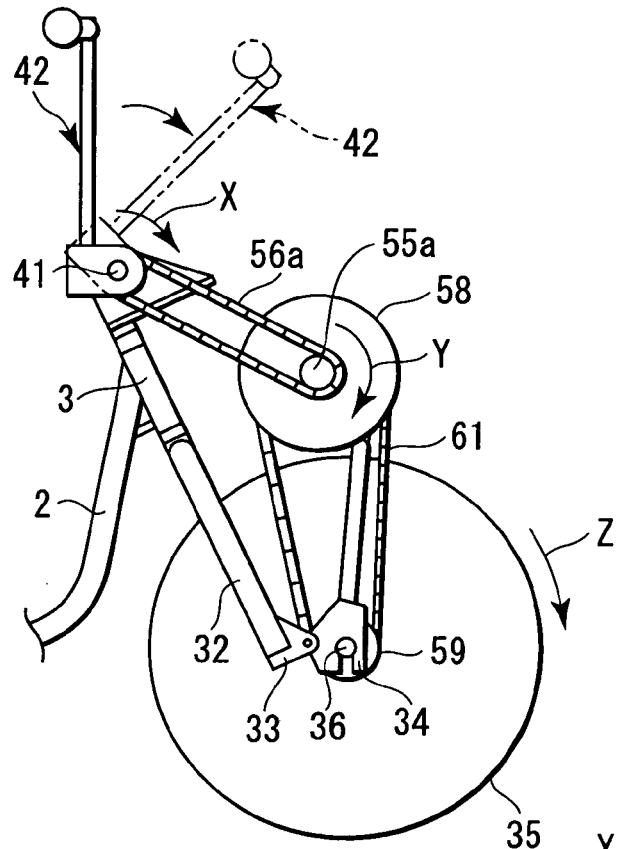
FIG. 12A is a view useful in explaining the operation performed to push the handle forward.

As shown in FIGS. 3 and 5, a handle post 30 is inserted in the cylindrical bearing 3 such that it can rotate but cannot move vertically. A bearing member 31 is attached to the upper end of the handle post 30. The lower portion of the handle post 30 downwardly projecting from the cylindrical bearing 3 is formed into a pair of supports 32. As shown in FIG. 1, a first bracket 33 is provided at the lower end of each support 32. FIG. 1 shows one bracket 33, while FIG. 12A shows the other bracket 33.

A second bracket 34 is secured to each first bracket 33. A front wheel 35 is provided between a pair of second brackets 34 that are separate from each other by a predetermined interval. The front wheel 35 is supported by the second brackets 34 so that it can rotate about an axle 36. A three- to seven-speed manual transmission (not shown) is connected to the axle 36.

An automatic transmission may be provided instead of the manual transmission. In the automatic transmission, the gears are automatically shifted in accordance with the rotational speed of the front wheel 35. Therefore, when the rotational speed of the front wheel 35 is increased or decreased during traveling a flat road or slop, the gears are automatically shifted.

Figure 4:
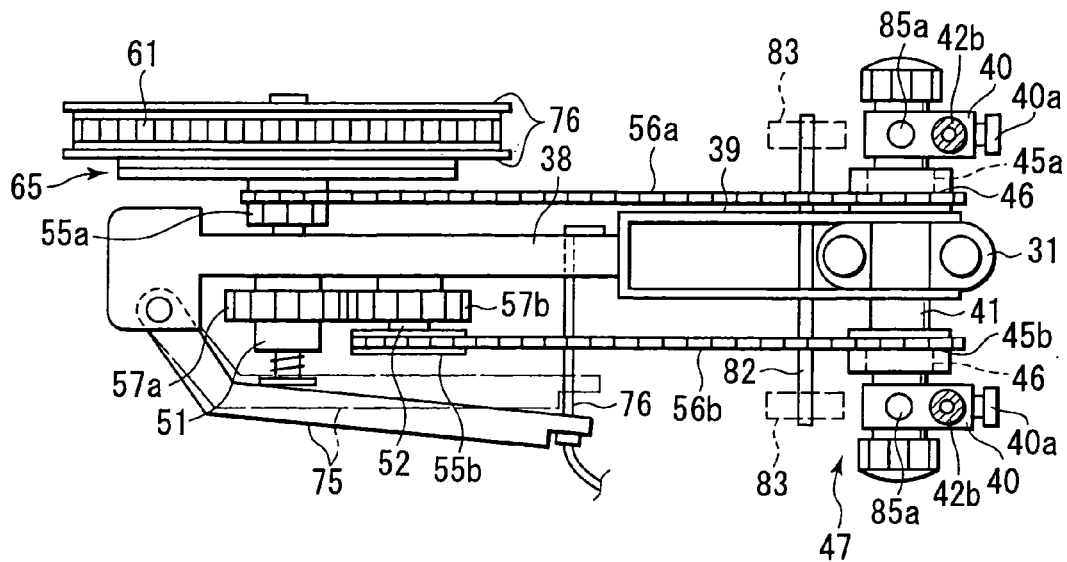
FIG. 4 is a plan view of the driving mechanism shown in FIG. 3.

The lower ends of a pair of stems 37 that hold the front wheel 35 therebetween are fixed to the respective second brackets 34. An end of an attachment member 38 is fixed to the upper ends of the stems 37 as shown in FIGS. 3 to 5. The other end of the attachment member 38 is coupled to a coupling member 39 secured to the upper end of the cylindrical bearing 3.

Figure 2B:
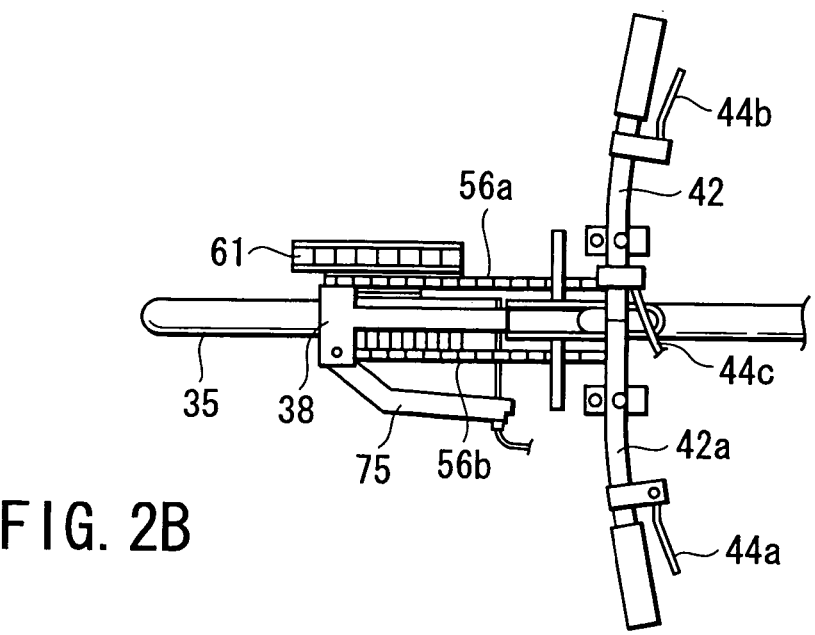
FIG. 2B is a plan view illustrating the front-wheel portion.

A swing-enabling shaft 41 is rotatably supported by the bearing member 31 provided on the upper end of the handle post 30, via a bearing (not shown) interposed therebetween. As shown in FIG. 3, respective attachment blocks 40 are secured to the opposite ends of the swing-enabling shaft 41. The lower ends of a pair of attachment portions 42b, whose upper ends are secured to the respective attachment blocks 40 at a predetermined interval, are fixed to the horizontal portion 42a of a handlebars unit 42, as is shown in FIG. 2. As a result, the stroke of swing movement of the handlebars unit 42, which corresponds to the distance between the swing-enabling shaft 41 and the horizontal portion 42a of the handlebars unit 42, can be varied in accordance with the user.

A pair of grips 43 are provided at the opposite ends of the horizontal portion 42a of the handlebars unit 42. A brake lever 44a is provided near one of the grips 43, a transmission lever 44b for operating the transmission is provided near the other grip 43, and a clutch lever 44c for disconnecting a clutch 65, described later, is provided at the middle of the horizontal portion 42a. The clutch lever 44c and clutch 65 provide a power interrupting mechanism.

When the handlebars unit 42 is swung back and forth, the swing-enabling shaft 41 rotates alternately in the forward and backward directions, whereby the rotation is transmitted to the front wheel 35 by a driving mechanism 47 shown in FIG. 4 to rotate the front wheel 35 forward. The driving mechanism 47 includes a pair of first sprockets 45a and 45b as first power transmission wheels provided at the opposite sides of the bearing member 31.

The first sprockets 45a and 45b are attached to the swing-enabling shaft 41 via respective one-way clutches 46. One of the one-way clutches 46 permits one of the first sprockets, i.e., the first sprocket 45a, to be synchronized with only one-way rotation, e.g., forward rotation, of the swing-enabling shaft 41, while the other one-way clutch 46 permits the other first sprocket 45b to be synchronized with only the opposite rotary movement of the shaft 41.

In other words, one of the first sprockets, i.e., the first sprocket 45a, rotates together with the swing-enabling shaft 41 when the handlebars unit 42 is swung forward as indicated by the solid line in FIG. 12A from the state indicated by the chain line in the figure. Further, the first sprocket 45a races with respect to the swing-enabling shaft 41 when the handlebars unit 42 is swung back as indicated by the solid line in FIG. 12B from the state indicated by the chain line in the figure.

Figure 12B:
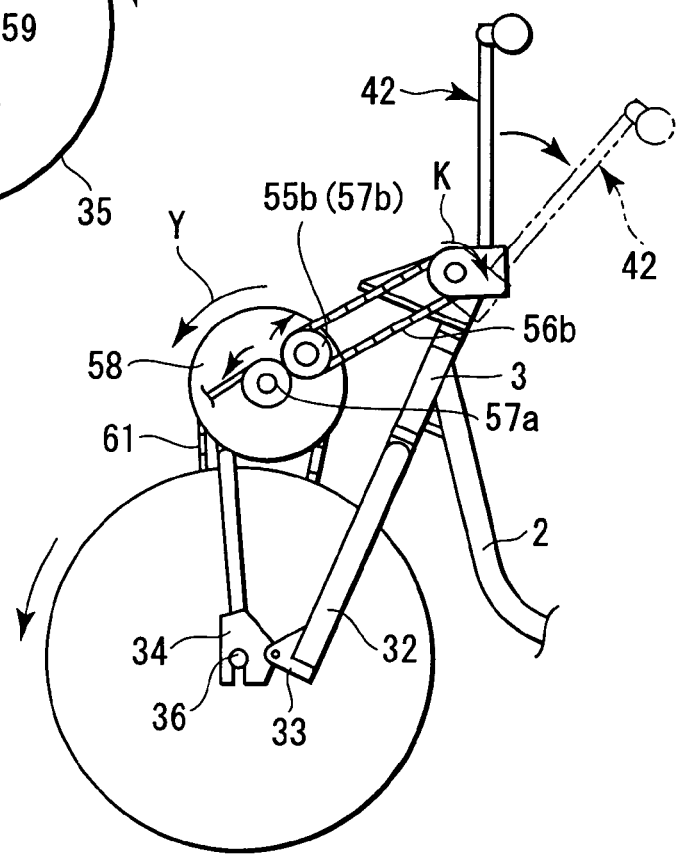
FIG. 12B is a side view opposite to FIG. 12A, useful in explaining the operation performed to backward return the forward pushed handle.

The other first sprocket 45b races with respect to the swing-enabling shaft 41 when the handlebars unit 42 is swung in a direction in which it is inclined forward as shown in FIG. 12A, while it rotates together with the swing-enabling shaft 41 when the handlebars unit 42 is swung from back to forth as shown in FIG. 12B.

Figure 6A:
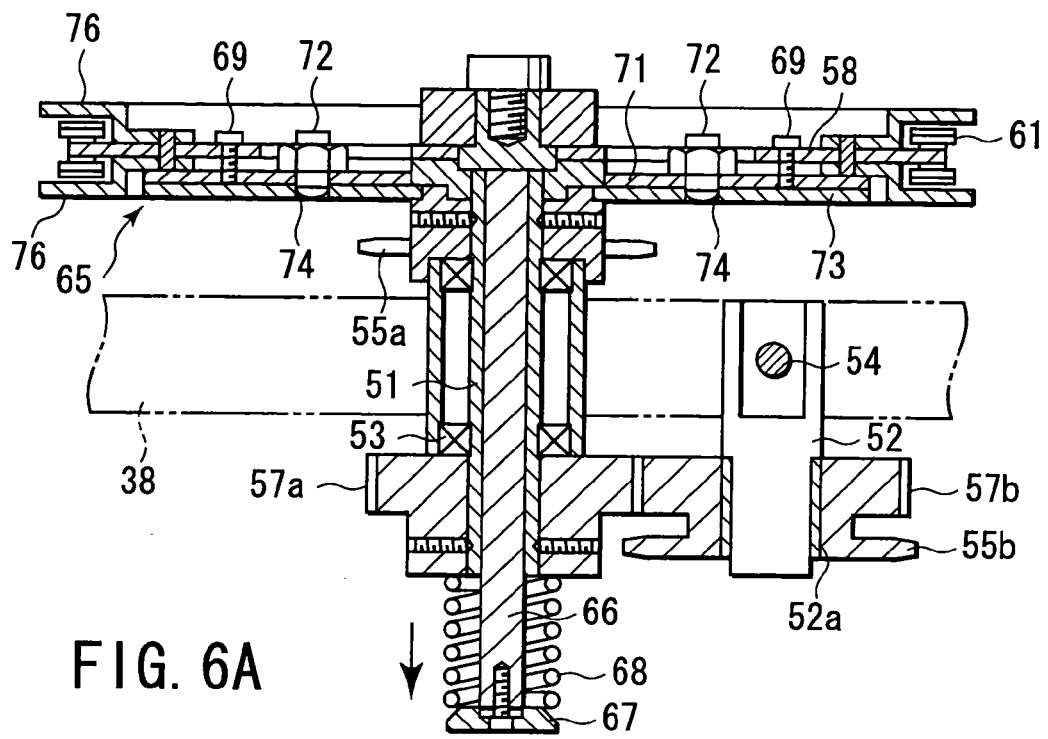
FIG. 6A is a sectional view illustrating a state in which the clutch mechanism of the driving mechanism is connected.
Figure 6B:
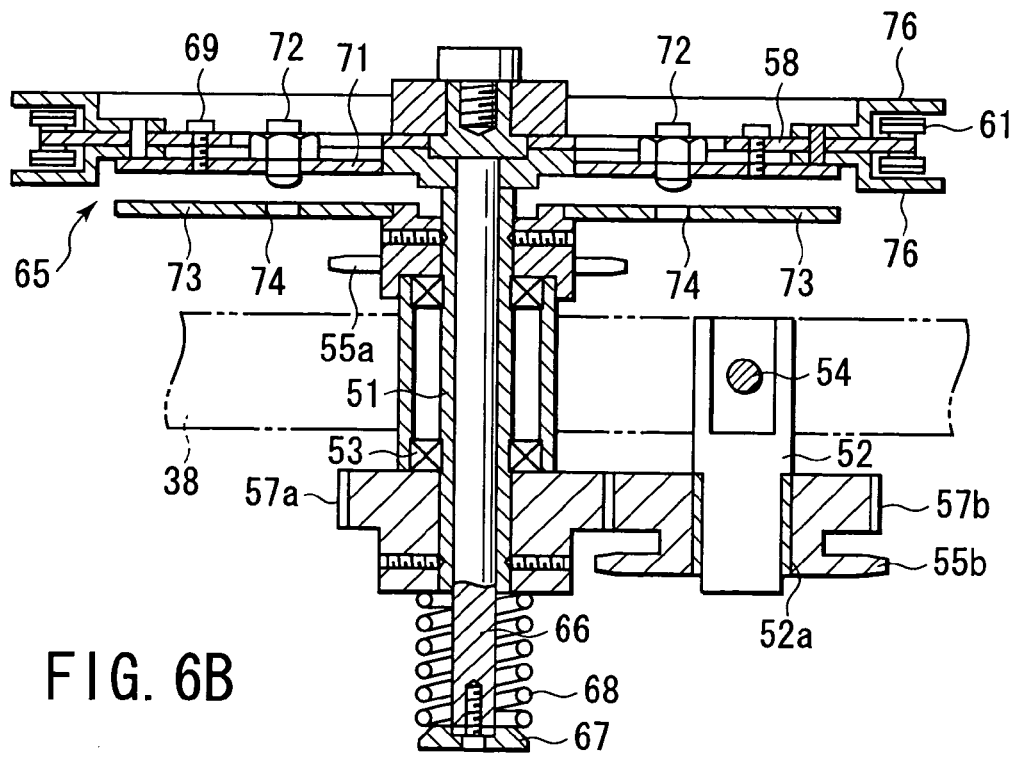
FIG. 6B is a sectional view illustrating a state in which the clutch mechanism of the driving mechanism is disconnected.

As shown in FIGS. 6A and 6B, first and second support shafts 51 and 52 extending parallel to each other are provided at an end of the attachment member 38. The first support shaft 51 is arranged rotatable by a bearing 53, while the second support shaft 52 is fixed in position by a pin 54. The first support shaft 51 is a hollow member, and has opposite ends projecting from the opposite sides of the attachment member 38 in the width direction of the member 38. A second sprocket 55a as a second power transmission wheel is secured to one end of the first support shaft 51 projecting from one side of the member 38.

Another second sprocket 55b as another second power transmission wheel is rotatably fitted, via a bearing 52a, on one end of the second support shaft 52 projecting from the other side of the attachment member 38. As seen from FIG. 4, the pair of second sprockets 55a and 55b are located in the longitudinal direction of the tricycle body 1 corresponding to the pair of first sprockets 45a and 45b, respectively.

A first chain 56a as a power transmission member is stretched between one of the first sprockets, i.e., first sprocket 45a, and one of the second sprockets, i.e., second sprocket 55a, while another first chain 56b as another power transmission member is stretched between the other first and second sprockets 45b and 55b.

First and second gears 57a and 57b that are engaged with each other and form a gear train are provided at the other ends of the first and second support shafts 51 and 52. The first gear 57a is fitted on the first support shaft 51, while the second gear 57b is formed integral with the other second sprocket 55b and rotatably provided on the support shaft 52. When the first sprocket 45a rotates together with the swing-enabling shaft 41, their rotary movement is transmitted to the second sprocket 55a via the first chain 56a. As a result, the first support shaft 51 is rotated.

When the other first sprocket 45b rotates together with the swing-enabling shaft 41, their rotation is transmitted to the other second sprocket 55b via the other first chain 56b. As a result, the second support shaft 52 is rotated. When the second support shaft 52 is rotated, its rotation is converted into opposite-directional rotation by the first gears 57b and 57a, and transmitted to the first support shaft 51.

In short, the first support shaft 51 is arranged to rotate in the same direction as the first sprocket 45a, and as the other first sprocket 45b that rotates in the opposite direction to the sprocket 45a.

A first driving wheel 58 formed of a sprocket is provided on the one end of the first support shaft 51 such that it can rotate in synchrony with the first support shaft 51 via the clutch 65 that forms a power interruption mechanism described later. A second driving wheel 59 (see FIG. 1) formed of a sprocket having a smaller diameter than the first driving wheel 58 is provided at one side of the front wheel 15 on the axle 36 supporting the front wheel 15 such that the wheel 15 can rotate.

A second chain 61 is stretched between the first and second driving wheels 58 and 59. Accordingly, when the first support shaft 51 is rotated, the front wheel 15 is rotated in the direction in which the tricycle body 1 advances, via the first driving wheel 58, second chain 61 and second driving wheel 59.

The first and second chains 56a, 56b and 61 are provided with respective chain stretching devices (not shown) for supplying the chains with a predetermined tension so as not to loosen them. These devices prevent detachment of the chains, and make them reliably transmit power.

As shown in FIG. 6A, the clutch 65 has an operation shaft 66 slidably inserted in the hollow first support shaft 51. One end of the operation shaft 66 outwardly projects from one end surface of the first gear 57a, and a brim 67 is provided on the projection end. A spring 68 that presses the operation shaft 66 in the direction indicated by the arrow is interposed between the brim 67 and an end surface of the first gear 57a.

The other end of the operation shaft 66 outwardly projects from a side surface of one of the first sprockets, i.e., the first sprocket 45a, and the first driving wheel 58 is fixedly fitted on the projecting end. A movable disc 71 is secured, by screws 69, to a side surface of the first driving wheel 58 close to the first sprocket 45a. A plurality of engagement pins 72 projecting toward the second sprocket 55a are provided through the movable disc 71 at regular intervals along the circumference.

A stationary disc 73 is secured to a side surface of the second sprocket 55a. A plurality of engagement holes 74 to be engaged with the engagement pins 72 are formed in the stationary disc 73 at regular circumferential intervals corresponding to the engagement pins 72. Where the operation shaft 66 is pressed by the restoration force of the spring 68, the engagement pins 72 are engaged with the engagement holes 74, thereby making the movable disc 71 in pressure contact with the stationary disc 73. In this state, the first driving wheel 58 is rotated by the rotation of the first support shaft 51. Respective covers 76 are provided on the opposite side surfaces of the first driving wheel 58. The covers 76 cover the portion of the second chain 61 that is engaged with the first driving wheel 58.

As shown in FIGS. 3 and 4, an end of an operation lever 75 is rotatably coupled to the distal end of the attachment member 38. The middle portion of the operation lever 75 opposes the brim 67 provided at an end of the operation shaft 66. The other end of the operation lever is coupled to an end of an operation wire 76, the other end of which is connected to an end of the clutch lever 44c.

When the clutch lever 44c is operated, the operation lever 75 pivots about the above-mentioned one end from the position indicated by the solid line in FIG. 4 to the position indicated by the chain line. AS a result, the operation shaft 66 is pressed by the middle portion of the operation lever 75, therefore axially slid against the pressing force of the spring 68. When the operation shaft 66 is slid against the pressing force of the spring 68, the movable disc 71 and first driving wheel 58 are moved in accordance with the sliding movement. As a result, the movable disc 71 is detached from the stationary disc 73, and the engagement pins 72 of the movable disc 71 are disengaged from the engagement holes 74 of the stationary disc 73, as is shown in FIG. 6B. This interrupts the transmission of power between the first driving wheel 58 and first support shaft 51 via the clutch 65.

As seen from FIG. 1, a cover 81 covers the driving mechanism 47 for driving the front wheel 35 using the swing operation of the handlebars unit 42, i.e., covers the first sprockets 45a, 45b, second sprockets 55a, 55b and first chains 56a, 56b, etc.

As shown in FIGS. 4 and 10, cam-shaped swing-limiting members 83 attached to the opposite ends of an attachment shaft 82 are provided on the opposite outer surface portions of the cover 81.

As seen from FIG. 3, a pair of engagement shafts 85a and 85b that cooperate with the swing-limiting member 83 to provide swing-angle-limiting means are provided on each attachment block 40. As seen from FIG. 10A, one of the engagement shafts, 85a, is brought into contact with one side surface 83a of the swing-limiting member 83 when the handlebars unit 42 is swung forward. As seen from FIG. 10B, the other engagement shaft 85b is brought into contact with the outer side surface 83b of the swing-limiting member 83 when the handlebars unit 42 is swung backward. As a result, the angle of the forward and backward swing of the handlebars unit 42 is limited.

Since the swing angle of the handlebars unit 42 is limited, the upper half of the user body is prevented from being excessively inclined forward or backward. The swing-limiting member 83 and engagement shaft 85 form a swing angle limiting mechanism 86. The forward and backward swing angle of the handlebars unit 42 limited by the swing angle limiting mechanism 86 can be adjusted for the user by exchanging the swing-limiting member 83, which the engagement shaft 85 contacts, for another of a different configuration. Adjustments in light of the height or body shape of the user can be achieved by an adjusting mechanism for changing the height and forward/backward position of the seat section 10, or by adjusting the swing stroke of the handlebars unit 42, as well as by the swing-limiting member 83.

As shown in FIGS. 9A to 9C, a steering angle limiting mechanism 88 for limiting the angle of horizontal rotation of the handlebars unit 42 is provided at the coupling portion of the beam 2 cylindrical bearing 3 of the tricycle body 1. Specifically, the steering angle limiting mechanism 88 has an attachment member 89 having an end thereof fixed to the upper end of the handle post 30. The upper end of the attachment member 89 provides a hooked support section 91.

The intermediate portion of a U-shaped steering angle limiting member 92 is rotatably supported by the support section 91. The steering angle limiting member 92 can be rotated to and held in a standing position as indicated by the solid lines in FIGS. 9A and 9B. In this position, opposite side portions 92a hold the front end portion of the beam 2 of the tricycle body 1 with a predetermined interval between the side portions.

By virtue of this structure, when the handle post 30 is rotated in accordance with the steering movement (i.e., horizontal pivoting movement) of the handlebars unit 42, the front end of one side portion 92a or the other is brought into contact with the beam 2. As a result, the steering angle of the handlebars unit 42 is limited.

The beam 2 has a stopper member 93 for preventing the steering angle limiting member 92 from rotating in the direction indicated by the arrow of FIG. 9B when one of the side portions 92a is brought into contact with the beam 2.

In this embodiment, the steering angle of the handlebars unit 42 is limited to 40 degrees or less. As a result, the handlebars unit 42 is prevented from being sharply angled, thereby preventing the tricycle body 1 from turning over and lying on its side.

If the steering angle limiting member 92 is rotated into the lying position indicated by the chain line in FIG. 9B, the opposite side portions 92a are detached from the beam 2, therefore the limitation on the steering angle of the handlebars unit 42 is released.

A torque adjusting member 94 for adjusting the torque of the handle post 30 relative to the cylindrical bearing 3 is provided on the lower end of the cylindrical bearing 3. If the torque of the handle post 30 is adjusted by the torque adjusting member 94, when, for example, a front basket (not shown) is attached to the handle post 30 and a load is contained in the basket, the handlebars unit 42 can be prevented from being unintentionally rotated because of the weight of the load.

In the invention, the driving mechanism 47 is formed of elements for converting the swing movement of the handlebars unit 22 into rotary movement and transmitting the rotary movement to the front wheel 35. The element included in the driving mechanism 47 that transmits the rotary movement of the pair of second sprockets 55a and 55b to the front wheel 35 via the first support shaft 51 provides a power transmission mechanism.

In the hand-driven tricycle constructed as above, to move the tricycle body 1, the user sitting on the seat 8 with their feet placed on the footboards 9 takes the grips 43 of the handlebars unit 42, and swings the handlebars unit 42 forward and backward. When the handlebars unit 42 is pushed forward, the swing-enabling shaft 41 rotates in the direction indicated by arrow X in FIG. 12B. In synchrony with the rotary movement, one of the first sprockets, i.e., the first sprocket 45a, is rotated via the one-way clutch 46, whereas the other first sprocket 45b is raced by the other one-way clutch 46. As a result, the first support shaft 51 is rotated in the same direction, indicated by arrow Y in the figure, as the swing-enabling shaft 41 via one of the first chains, i.e., the chain 56a, and one of the second sprockets, i.e., the sprocket 55a.

When one of the first sprockets, i.e., the sprocket 45a, is rotated to rotate the first support shaft 51 via one of the first chains, i.e., the chain 56a, the rotary movement is converted into reverse rotary movement with respect to that of the first sprocket 45a and transmitted to the other first sprocket 45b via the first and second gears 57a and 57b and the other first chain 56b. However, since the other first sprocket 45b is raced with respect to the swing-enabling shaft 41 by the one-way clutch 46, it does not interrupt the rotation of the swing-enabling shaft 41 in the direction indicated by arrow X.

As a result, the first driving wheel 58 provided at an end of the first support shaft 51 via the clutch 65 rotates in the same direction, and its rotary movement is transmitted to the second driving wheel 59 via the second chain 61. The rotation of the second driving wheel 59 rotates the front wheel 35 in the direction indicated by arrow Z, i.e., in the direction in which the tricycle body 1 advances.

When the forward pushed handlebars unit 42 is backward pulled to rotate the swing shaft 41 in the direction indicated by arrow K in FIG. 12B (in the direction opposite to the direction indicated by arrow X in FIG. 12A), the first sprocket 45a is raced with respect to the swing-enabling shaft 41 by the one-way clutch 46. However, the other first sprocket 45b is rotated together with the swing-enabling shaft 41 in the direction indicated by arrow K.

When the other first sprocket 45b is rotated in the direction indicated by arrow K, its rotary movement is transmitted, via the other first chain 56b, the other second sprocket 55b provided around the second support shaft 52. The rotary movement of the other second sprocket 55b is converted into reverse rotary movement by the second and first gears 57b and 57a, and then transmitted to the first support shaft 51 provided with the first gear 57a.

In other words, when the handlebars unit 42 is backward returned from the forward inclined state to rotate the swing-enabling shaft 41 in the opposite direction, its rotation is converted into reverse rotation by the second and first gears 57b and 57a and then transmitted to the first support shaft 51.

Accordingly, even when the forward pushed handlebars unit 42 is backward returned, the first driving wheel 58 provided around the first support shaft 51 via the clutch 65 is rotated in the same direction as when the handlebars unit 42 is forward pushed, i.e., in the direction indicated by arrow Y in the figure. Therefore, the front wheel 35 can be rotated by the rotary movement of the first driving wheel 58 in the direction in which the tricycle body 1 advances. Thus, the swing movement of the handlebars unit 42 in the forward/backward direction causes the front wheel 35 to be always rotated in the direction in which the tricycle body 1 advances.

When the handlebars unit 42 is backward returned to forwardly rotate the front wheel 35, the rotary movement of the front wheel 35 is transmitted to the first sprocket 45a via the second sprocket 55a provided around the first support shaft 51, and the first chain 56a. At this time, the rotation direction of the first sprocket 45a is opposite to that of the other first sprocket 45b that rotates in synchrony with the swing-enabling shaft 41.

However, when the handlebars unit 42 is backward returned to rotate the swing-enabling shaft 41 in the direction indicated by arrow K, one of the first sprockets, i.e., the first sprocket 45a, is raced by the one-way clutch 46 with respect to the rotation of the swing-enabling shaft 41. Accordingly, the first sprocket 45a does not interrupt the rotation of the swing-enabling shaft 41 in the direction indicated by arrow K.

In the hand-driven tricycle constructed as above, in which the handlebars unit 42 is swung forward and backward to advance the tricycle body 1, the user may want to move back the tricycle body 1, for example, if it has passed a predetermined parking position, or in order to park it in a predetermined position. To move back the tricycle body 1, it is necessary to backwardly rotate the front wheel 35, as well as the rear wheels 4. The rear wheels 4 can be freely rotated backward. On the other hand, when the front wheel 35 is backwardly rotated, the rotary movement of the front wheel 35 is transmitted to the first driving wheel 58 via the second driving wheel 59 and second chain 61 that provide the driving mechanism. As a result, the first driving wheel 58 rotates in the direction opposite to that indicated by arrow Y in FIGS. 12A and 12B.

When the first driving wheel 58 rotates in the direction opposite to the direction indicated by arrow Y, the first support shaft 51 rotates in the same direction as the first driving wheel via the clutch 65. The rotary movement of the first support shaft 51 is transmitted to one of the first sprockets, i.e., the first sprocket 45a, via the corresponding one of the first chains, i.e., the first chain 56a. Further, the rotary movement of the first support shaft 51 is converted into reverse rotary movement by the first and second gears 57a and 57b, and then transmitted to the other first sprocket 45b via the other first chain 56b.

As a result, the pair of first sprockets 45a and 45b attempt to simultaneously rotate in opposite directions. In this case, their rotary movements are transmitted to the swing-enabling shaft 41 via the respective one-way clutches 46, thereby disabling the rotation of the swing-enabling shaft 41. This means that the front wheel 35 cannot rotate and hence the tricycle body 1 cannot move back.

In light of the above, to move back the tricycle body 1, the clutch lever 44c is gripped to disengage the clutch 65 so as to interrupt the transmission of power from the front wheel 35 to the driving mechanism 47. In other words, when the front wheel 35 is rotated backward, the rotary movement of the first driving wheel 58 that rotates together with the front wheel 35 via the second driving wheel 59 and second chain 61 is prevented from being transmitted to the first support shaft 51.

As a result, even if the front wheel 35 is rotated backward, the rotary movement of the front wheel 35 is prevented from being converted into opposite directional rotary movements and transmitted to the pair of first sprockets 45a and 45b provided around the swing-enabling shaft 41 of the driving mechanism 47. This enables the front wheel 35 to be smoothly moved backward. In short, the tricycle body 1 can be moved back by backward pushing the tricycle body 1 with the clutch lever 44c gripped. Moreover, since the handlebars unit 42 is prevented from being swung forward or backward during moving back, it does not interfere the moving back operation by the user.

When the tricycle body 1 is moved back, the user may backwardly rotate the rear wheels 4 by operating, using one hand, one of the handrims 4a connected to the rear wheels, with the clutch lever 44c gripped using the other hand. If a care assistant can help the user, they may move back the tricycle body while having the clutch lever 44c gripped by the user and grasping the cylindrical grip portions 19 of the handle member 18 provided on the back 6 of the seat section 10.

The care assistant can move the tricycle body 1 by themselves by gripping the clutch lever 44c to disengage the clutch 65, and grasping the cylindrical grip portions 19 of the handle member 18. If the clutch lever 44c can be held in a gripped state by, for example, a stopper (not shown), the operation for, for example, moving back the tricycle body 1 can be easily performed.

The user can change the direction of travel of the tricycle body 1 by rotating the handle post 30 using the handlebars unit 42 while steering the handlebars unit 42. Thus, the direction of travel of the tricycle body 1 can be smoothly changed. If the steering angle of the handlebars unit 42 is too large, the tricycle body 1 may turn over. However, the rotational angle of the handle post 30, i.e., the steering angle, is set, by the steering angle limiting mechanism 88, to a value falling within a range within which the tricycle body 1 does not turn over, e.g., 40 degrees or less in each of the right and left directions. Therefore, the user can change the direction of travel safely.

The swing angle of the handlebars unit 42 in the forward/backward direction is limited by the swing angle limiting mechanism 86. This enables the user sitting on the seat section 10 to swing the handlebars unit 42 without excessively inclining the upper half of the body in the forward or backward direction, which means that the operation of advancing the tricycle body 1 can be performed relatively easily.

The present invention is not limited to the above-described embodiment. In the embodiment, a description has been given of a tricycle, as a hand-driven vehicle, which has a single front wheel and a pair of rear wheels. However, the invention is also applicable to a four-wheeler having two front wheels and two rear wheels, and a bicycle having a single front wheel and rear wheel.

Further, pulleys and belts may be used in the driving mechanism instead of the sprockets and chains.

What is claimed is:

1. A hand-driven vehicle comprising:
   a vehicle body;
   a rear wheel rotatably provided at a rear portion of the vehicle body;
   a rotatable handle post at a front portion of the vehicle body;
   a front wheel rotatably provided at a lower portion of the handle post;
   a swing-enabling shaft rotatably provided on an upper portion of the handle post;
   a handlebars unit attached to the swing-enabling shaft such that the handlebars unit can swing forward and backward relative to the vehicle body while rotating the swing-enabling shaft forward and backward;
   a driving mechanism which outputs a rotational force that rotates the front wheel only in a direction in which the vehicle body advances, in accordance with the forward and backward rotation of the swing-enabling shaft;
   a power transmission mechanism which transmits, to the front wheel, the rotational force output from the driving mechanism; and
   a power interrupting mechanism which is provided between the power transmission mechanism and the driving mechanism, and which is operable to interrupt transmission of power from one of the power transmission mechanism and the driving mechanism to the other;
   wherein the driving mechanism includes:
      a pair of first power transmission wheels arranged on the swing-enabling shaft via respective one-way clutches such that one of the pair of first power transmission wheels rotates in synchrony with a forward rotary movement of the swing-enabling shaft, and the other first power transmission wheel rotates in synchrony with a backward rotary movement of the swing-enabling shaft;
      a pair of second power transmission wheels rotatably provided at positions corresponding to the pair of first power transmission wheels;
      a pair of power transmission members each stretched between one of the pair of first power transmission wheels and a corresponding one of the pair of second power transmission wheels, the pair of power transmission members each transmitting, to a corresponding one of the pair of second power transmission wheels, a rotary movement of a corresponding one of the pair of first power transmission wheels, which rotate in different directions corresponding to the forward rotary movement and the backward rotary movement of the swing-enabling shaft; and a gear train which converts rotary movements in different directions of the pair of second power transmission wheels into a rotary movement in a single direction;

wherein the power transmission mechanism includes:
a first driving wheel rotated by an output of the driving mechanism via the power interrupting mechanism;
a second driving wheel rotatable together with the front wheel; and
a second power transmission member which is stretched between the first driving wheel and the second driving wheel, and which transmits the output of the driving mechanism to the front wheel; and wherein the power interrupting mechanism comprises:
a clutch which is interposed between the power transmission mechanism and one of the second power transmission wheels, and which includes a fixed disc which rotates together with the one of the second power transmission wheels and a movable disc that is formed integrally with the first driving wheel and elastically urged toward the fixed disc; and
a clutch lever which interrupts power transmission via the clutch by displacing the movable disc away from the fixed disc when the clutch lever is operated.

2. The hand-driven vehicle according to claim 1, wherein the vehicle body includes a seat section which permits a user to sit thereon, and wherein a forward/backward directional position and a vertical position of the seat section is adjustable relative to the vehicle body.

3. The hand-driven vehicle according to claim 2, wherein a distance between the handlebars unit and the swing-enabling shaft is adjustable.

4. The hand-driven vehicle according to claim 1, wherein the vehicle body includes a seat section which permits a user to sit thereon and which includes a pair of armrests rotatably provided at opposite sides thereof.

5. hand-driven vehicle comprising:
a vehicle body;
a rear wheel rotatably provided at a rear portion of the vehicle body;
a rotatable handle post at a front portion of the vehicle body;
a front wheel rotatably provided at a lower portion of the handle post;
a swing-enabling shaft rotatably provided on an upper portion of the handle post;
a handlebars unit attached to the swing-enabling shaft such that the handlebars unit can swing forward and backward relative to the vehicle body while rotating the swing-enabling shaft forward and backward;
a driving mechanism which outputs a rotational force that rotates the front wheel only in a direction in which the vehicle body advances, in accordance with the forward and backward rotation of the swing-enabling shaft;
a power transmission mechanism which transmits, to the front wheel, the rotational force output from the driving mechanism; and
a power interrupting mechanism which is provided between the power transmission mechanism and the driving mechanism, and which is operable to interrupt transmission of power from one of the power transmission mechanism and the driving mechanism to the other;

wherein the vehicle body includes a seat section which permits a user to sit thereon, and which includes a back, a holding member attached to a rear surface of the back for elastically holding an upper portion of an object, and a receiver below the holding member to receive a lower end of the object.

6. The hand-driven vehicle according to claim 1, wherein the vehicle body includes a seat section which permits a user to sit thereon, and which includes a back, a grip member that is attached to a rear surface the back to be gripped to push and pull the vehicle body.

7. A hand-driven vehicle comprising:
a vehicle body;
a plurality of rear wheels rotatably provided at a rear portion of the vehicle body;
a rotatable handle post at a front portion of the vehicle body;
a front wheel rotatably provided at a lower portion of the handle post;
a swing-enabling shaft rotatably provided on an upper portion of the handle post;
a handlebars unit attached to the swing-enabling shaft such that the handlebars unit can swing forward and backward relative to the vehicle body while rotating the swing-enabling shaft forward and backward;
a driving mechanism which outputs a rotational force that rotates the front wheel only in a direction in which the vehicle body advances, in accordance with the forward and backward rotation of the swing-enabling shaft;
a power transmission mechanism which transmits, to the front wheel, the rotational force output from the driving mechanism;
a power interrupting mechanism which is provided between the power transmission mechanism and the driving mechanism, and which is operable to interrupt transmission of power from one of the power transmission mechanism and the driving mechanism to the other; and
handrims which are attached to respective outside portions of the rear wheels, and which are used to rotate the rear wheels manually.

8. A hand-driven comprising:
a vehicle body;
a rear wheel rotatably provided at a rear portion of the vehicle body;
a rotatable handle post at a front portion of the vehicle body;
a front wheel rotatably provided at a lower portion of the handle post;
a swing-enabling shaft rotatably provided on an upper portion of the handle post;
a handlebars unit attached to the swing-enabling shaft such that the handlebars unit can swing forward and backward relative to the vehicle body while rotating the swing-enabling shaft forward and backward; and
a driving mechanism which outputs a rotational force that rotates the front wheel only in a direction in which the vehicle body advances, in accordance with the forward and backward rotation of the swing-enabling shaft;
a power transmission mechanism which transmits, to the front wheel, the rotational force output from the driving mechanism; and a steering angle limiting mechanism which limits a rotational angle of the handle post when the handle post is rotated to change a direction of the front wheel using the handlebars unit;

wherein the steering angle limiting mechanism comprises:
   an attachment member including a support portion attached to the handle post; and
   a steering angle limiting member including a pair of side portions and a middle portion rotatably supported by the support portion, wherein the pair of side portions are rotatable between a standing position in which the side portions hold the vehicle body therebetween, and a lying position in which the side portions do not oppose the vehicle body.

9. The hand-driven vehicle according to claim 8, further comprising an additional rear wheel and handrims which are attached to respective outside portions of the rear wheels, and which are used to rotate the rear wheels manually.

10. A hand-driven vehicle comprising:
   a vehicle body;
   a rear wheel rotatably provided at a rear portion of the vehicle body;
   a rotatable handle post at a front portion of the vehicle body;
   a front wheel rotatably provided at a lower portion of the handle post;
   a swing-enabling shaft rotatably provided on an upper portion of the handle post;
   a handlebars unit attached to the swing-enabling shaft such that the handlebars unit can swing forward and backward relative to the vehicle body while rotating the swing-enabling shaft forward and backward;
   a driving mechanism which outputs a rotational force that rotates the front wheel only in a direction in which the vehicle body advances, in accordance with the forward and backward rotation of the swing-enabling shaft;
   a power transmission mechanism which transmits, to the front wheel, the rotational force output from the driving mechanism; and
   swing angle limiting means for limiting a swing angle of the handlebars unit in a forward/backward direction;
   wherein the swing angle limiting means comprises:
      engagement shafts which swing in synchrony with a swing movement of the handlebars unit; and
      a swing limiting member provided on the vehicle body, wherein the swing limiting member is brought into contact with the engagement shafts in a predetermined swing position when the handlebars unit is swung in the forward/backward direction.

* * * * *